(12) United States Patent
Hon

(10) Patent No.: US 9,409,270 B2
(45) Date of Patent: Aug. 9, 2016

(54) MACHINE TOOL HAVING ONBOARD MEASURING DEVICE

(71) Applicant: FANUC Corporation, Yamanashi (JP)

(72) Inventor: Yonpyo Hon, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 922 days.

(21) Appl. No.: 13/659,160

(22) Filed: Oct. 24, 2012

(65) Prior Publication Data

US 2013/0166044 A1    Jun. 27, 2013

(30) Foreign Application Priority Data

Dec. 22, 2011   (JP) ................................. 2011-281262

(51) Int. Cl.
| | | |
|---|---|---|
| *G05B 19/404* | (2006.01) | |
| *B23Q 11/10* | (2006.01) | |
| *B23Q 17/20* | (2006.01) | |
| *B23Q 17/22* | (2006.01) | |
| *B23Q 11/00* | (2006.01) | |

(52) U.S. Cl.
CPC ............ *B23Q 11/10* (2013.01); *B23Q 11/0075* (2013.01); *B23Q 17/20* (2013.01); *B23Q 17/22* (2013.01); *Y02P 70/171* (2015.11)

(58) Field of Classification Search
CPC .... B23Q 11/0075; B23Q 11/10; B23Q 17/20; B23Q 17/22
USPC ........................................................... 700/61
See application file for complete search history.

(56) References Cited

U.S. PATENT DOCUMENTS

| | | | | |
|---|---|---|---|---|
| 2,879,692 A | * | 3/1959 | Turner .................... | B23Q 17/24 33/791 |
| 4,536,661 A | * | 8/1985 | McMurtry ........... | B23Q 1/0009 307/119 |
| 5,103,959 A | * | 4/1992 | Carlson ................ | B23Q 7/1426 198/345.1 |
| 6,568,407 B1 | * | 5/2003 | Matsumiya ............... | B08B 3/02 134/201 |
| 7,788,819 B2 | | 9/2010 | Hon et al. | |
| 2009/0033271 A1 | | 2/2009 | Hon et al. | |
| 2010/0101105 A1 | * | 4/2010 | Hon ....................... | B23Q 17/20 33/503 |
| 2011/0232118 A1 | | 9/2011 | Hon et al. | |

FOREIGN PATENT DOCUMENTS

| | | |
|---|---|---|
| CN | 1278195 A | 12/2000 |
| CN | 101357443 A | 2/2009 |
| CN | 102198607 A | 9/2011 |
| JP | 04310352 A | 11/1992 |
| JP | 2003103437 A | 4/2003 |
| JP | 2010-105063 A | 5/2010 |
| TW | 201140012 A1 | 11/2011 |

OTHER PUBLICATIONS

Office Action mailed Jan. 13, 2014, corresponds to Chinese patent application No. 201210560770.2.
Decision to Grant a Patent with English translation (6 pages).

* cited by examiner

*Primary Examiner* — Mohammad Ali
*Assistant Examiner* — Yuhui R Pan
(74) *Attorney, Agent, or Firm* — Hauptman Ham, LLP

(57) ABSTRACT

A machine tool having an onboard measuring device automatically carries out various works which include ultra precision machining, washing and onboard measuring, by a numerical controller, without any interposition of a worker. For achieving this, an operation region of drive axes of the machine tool is previously divided into a machining region, a washing region and a measuring region. Positions of the drive axes are always monitored by the numerical controller, and when the drive axes enter each of the regions, a work allocated to each of the regions is automatically started and the work is continuously carried out until drives axes exit the region.

3 Claims, 9 Drawing Sheets

MACHINE TOOL HAVING ONBOARD MEASURING DEVICE

RELATED APPLICATIONS

The present application claims priority from, Japanese Application No. 2011-281262, filed Dec. 22, 2011, the disclosure of which is hereby incorporated by reference herein in its entirety.

BACKGROUND OF THE INVENTION

1. Field of the Invention

The present invention relates to a machine tool having an onboard measuring device.

2. Description of the Related Art

In an ultra precision machining, in order to achieve an accuracy of form of nano unit, a compensation machining by an onboard measurement is essential. In such onboard measurement, a machining object is not detached, as a result, it is possible to avoid occurrence of problems such as a repeatability in setting which is generated in a case where a machining object is detached and a thermal displacement of the machining object and the machine that is generated on the basis of a heat transmission from an operator's body at a time when the operator detaches or attaches the machining object. However, a conventional current onboard measuring system includes a portion to be manually carried out by a human operator when carrying out an onboard measurement, so it is necessary to remove such a portion from the onboard measuring system as much as possible so as to minimize an influence of the thermal displacement.

Further, in recent years, a demand for a high precision metal mold has been increased, and it comes to a matter of concern how production efficiency is raised. Accordingly, it is very important to shorten a cycle time for measuring and compensating as much as possible.

As a prior art onboard measuring system, for example, in Japanese Patent Application Laid-Open No. 2010-105063, there is disclosed a technique in which a measuring device is mounted on a machine tool, aiming at a high precision of a machining object and suppression of a thermal displacement (a temperature drift).

In the technique mentioned above, it is possible to do away with an attachment and detachment operation of the machining object, and avoid a direct contact of a worker with the machining object. However, a washing of the machining object during or after the machining or a positioning for a measuring work is performed according to a worker's judgment.

Accordingly, it is necessary to open a cover of a machine and perform a position check by a worker, and a temperature drift which is generated by an ambient air transmitted at that time will prevent a manufacturing of the metal mold having a high precision. Further, as a worker' judgment is required, it is necessary to temporarily interrupt the work every time machining, cleaning or measuring work is performed, so it is difficult to shorten a machining time which is important factor in a mass production of high precision metal molds. Further, the measurement precision and the machining time are widely changed dependent upon each worker's knowledge and a skill concerning an operation of an onboard measuring system, so it is difficult to stably produce metal molds each having a high accuracy of form.

SUMMARY OF THE INVENTION

Accordingly, for solving the problems of the prior art mentioned above, the object of the present invention is to provide a machine tool having an onboard measuring device that can make a measurement precision and a machining time constant without relying on a worker's knowledge and skill concerning an operation of an onboard measuring system, and can achieve a stable production of a machined product having a high accuracy of form.

A machine tool having an onboard measuring device according to the present invention has a plurality of drive axes, machines a machining object by controlling the drive axis by a numerical controller so as to relatively move a tool and the machining object, and carries out a measurement of the machining object by relatively moving the onboard measuring device and the machining object. The onboard measuring device has a probe. The machine tool having the onboard measuring device further comprises: a position detector which detects a position of each of the drive axes; an input unit which inputs a position which is detected by the position detector to the numerical controller; a work determining unit which determines, based on the positions of the drive axes input by the input unit, whether machining of the machining object is to be carried out, measurement of the machining object is to be carried out by the onboard measuring device, washing of the machining object is to be carried out, or washing of the probe is to be carried out; and an execution commanding unit which commands, based on the determination of the work determining unit, machining of the machining object, measurement by the onboard measuring device, washing of the machining object or washing of the probe.

The tool and the onboard measuring device may be attached to the same drive axis, a moving range of the drive axes in which machining of the machining object by the tool is possible may be assumed to be an effective machining range, and a moving range of the drive axes in which measurement of the machining object by the onboard measuring device is possible may be assumed to be an effective measuring range. And the work determining unit may determine: that the drive axes are in a state where machining of the machining object by the tool is possible if the drive axes are in the effective machining range; that the drive axes are in a washing standby state if the drive axes are in a range which belongs to neither the effective machining range nor the effective measuring range; that the drive axes are in a washing effective state if the drives axes enter the effective measuring range from the washing standby state; that the washing has been finished if the washing is stopped after the washing is actually carried out for a predetermined time from the washing effective state; or that the drive axes are in a state where measurement of the machining object is possible if the drive axes are in the effective measuring range and also in a state where the washing is finished.

The numerical controller may output a signal for executing a cutting motion by the tool, actuating a washing liquid nozzle, actuating a washing brush, actuating the onboard measuring device, or opening and closing a cover which protects the onboard measuring device, according to a working state based on the determination of the work determining unit.

The cover which protects the onboard measuring device may be a cover for protecting the onboard measuring device from a cutting liquid and a cut scrap, and the cover may be configured to be opened and closed by an actuator, and may be opened by the actuator when the work determining unit determines that the drive axes are in a state where measurement is possible.

According to the present invention, it is possible to provide a machine tool having an onboard measuring device which can make measurement precision and working time constant, and to achieve stable production of machined products each having a high accuracy of form, without relying on a worker's knowledge and skill concerning an operation of an onboard measuring system.

BRIEF DESCRIPTION OF THE DRAWINGS

The object and the feature which are mentioned above, and the other objects and features of the present invention will be apparent from the following description of embodiments with reference to the accompanying drawings. In the drawings.

DETAILED DESCRIPTION OF THE PREFERRED EMBODIMENTS

<Summary of the Invention>

A machine tool having an onboard measuring device according to the present invention automatically carries out various works which include ultra precision machining, washing and onboard measuring, by a numerical controller, without any interposition of a worker. For achieving these works, an operation region of drive axis of the machine tool is previously divided into a machining region, a washing region and a measuring region, and a position of the drive axis is always monitored by the numerical controller. When the drive axis enters each of the regions, a work allocated to each of the regions is automatically started, the work is continuously carried out until the drive axis moves away from the region.

Figure 1:
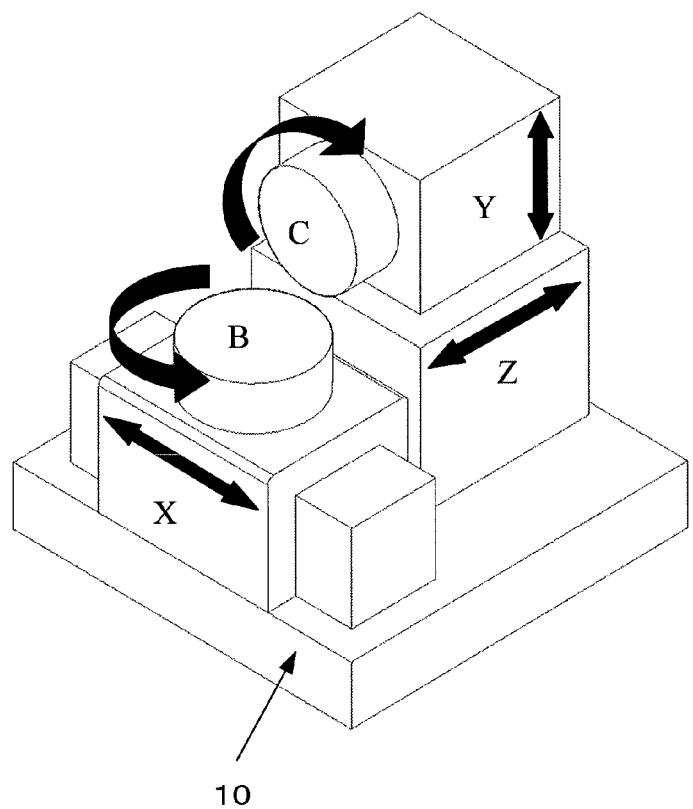
FIG. 1 is a view describing a substantial part of a machine tool which has three rectilinear axes, an X axis, a Y axis and a Z axis, and further has two rotating axes, a B axis arranged on the X axis and a C axis arranged on the Y axis.

FIG. 1 is a view describing a machine tool which is controlled by the numerical controller, and is constructed by three or more rectilinear axes and one or more rotating axes.

The machine tool has three rectilinear axes, an X axis, a Y axis and a Z axis, and has two rotating axe, a B axis arranged on the X axis and a C axis arranged on the Y axis, and can carry out a five-axes simultaneous control. It is possible to carry out a process of a work at a precision of nanometer order, by controlling each of the movable axes in a nanometer order.

Figure 2:
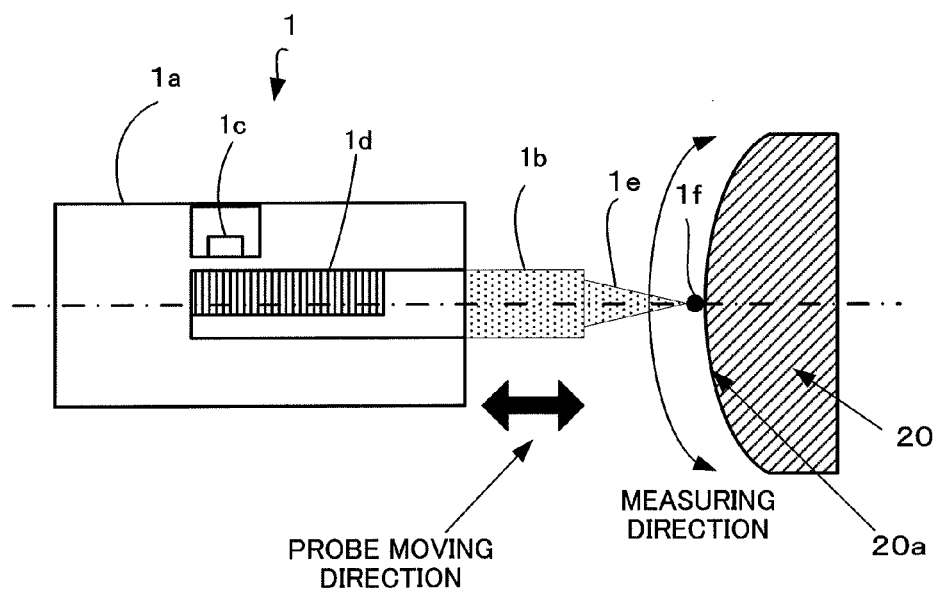
FIG. 2 is a view illustrating how to carry out a shape measurement of a measurement object on the basis of displacement information of a probe, wherein the probe is a movable portion of an onboard measuring device and a movement displacement of the probe is detected by a linear scale and a laser head, and the prove is relatively moved along a surface of a machining object.

FIG. 2 is a cross-sectional view of a substantial part describing one example of the onboard measuring device which is attached to a machine tool.

An onboard measuring device 1 is provided with a probe 1$b$ which is a movable portion housed in a case 1$a$. The probe 1$b$ can move in a direction of a center axis by a bearing (not illustrated) such as an air bearing or the like. A rod 1$e$ of a measuring element, provided with a spherical measuring element 1$f$, is attached to one end of the probe 1$b$. The rod 1$e$ of the measuring element is a fine rod-like member. Further, one end of the rod 1$e$ of the measuring element is fixed to the probe 1$b$, and the spherical measuring elelement 1$f$ is attached to the other end. The spherical measuring elelement 1$f$ comes into contact with a machining object surface 20$a$ of a machining object 20, and carries out a shape measurement. It is possible to measure a surface shape of the machining object surface 20$a$ of the machining object 20 by moving the probe 1$b$ along the machining object surface 20$a$ and measuring a displacement of the probe 1$b$.

The onboard measuring device 1 is provided with a linear scale 1$d$ and a laser head 1$c$ within the case 1$a$. The linear scale 1$d$ and the laser head 1$c$ constitute means for detecting a movement displacement of the probe 1$b$. Note that, a displacement detecting means using the laser head 1$c$ and the linear scale 1$d$ is well known. As illustrated in FIG. 2, the onboard measuring device 1 is moved along the machining object surface 20$a$ of the machining object 20, and a displacement of the probe 1$b$ is detected by the movement displacement detecting means (the linear scale 1$d$ and the laser head 1$c$). The movement displacement detecting means outputs a movement displacement detecting signal which represents the displacement of the probe 1$b$ (refer to FIG. 3). The movement displacement detecting signal is input as a measurement signal ipf from the onboard measuring device 1 to a personal computer 11 which will be mentioned later, and is stored as position information of the probe 1$b$ received from the onboard measuring device 1.

Figure 3:
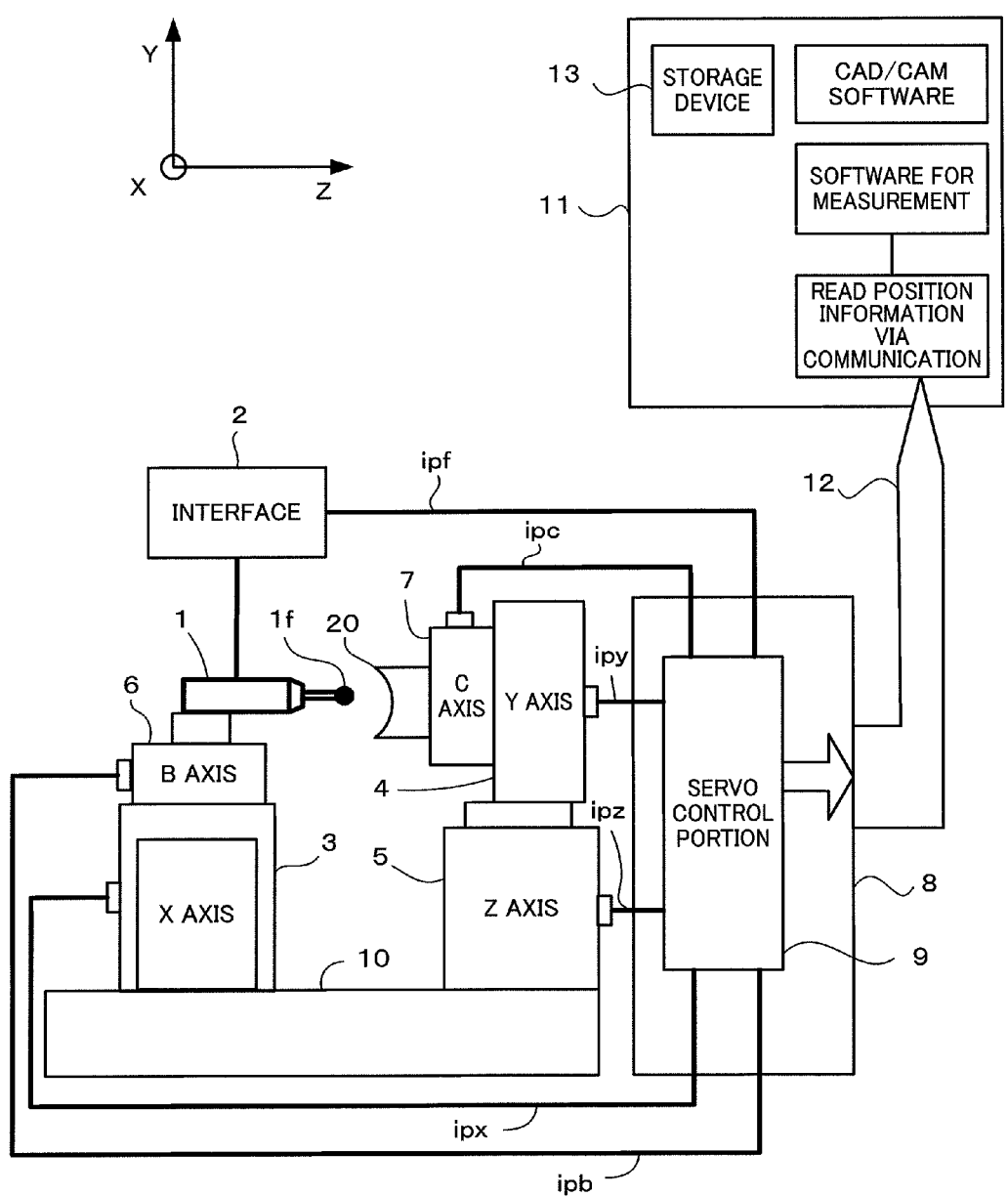
FIG. 3 is a view describing a system which has a machine tool provided with the onboard measuring device, and a numerical controller controlling the machine tool.

FIG. 3 is a view describing one example in which the onboard measuring device and the machine tool are connected. Respective axes of the X, Y, Z, B and C of the machine tool and the onboard measuring device which is attached to the B axis serving as a rotating shaft have interfaces of the same construction. That is, each of the X, Y, Z, B and C axes is provided with the interface for controlling each of the axes. Although the onboard measuring device 1 does not constitute a movable shaft of the machine tool, the signal obtained from the onboard measuring device 1 is stored in the personal computer 11 via a servo control portion 9 of the numerical controller 8 in the same manner as each of the movable axes X, Y, Z, B and C of the machine tool, by assuming the onboard measuring device 1 as a movable shaft of the machine tool. When attaching the onboard measuring device 1 to the machine tool, the onboard measuring device 1 is accommodated in an accommodating device 24 which is provided with an automatic opening and closing cover 25 as mentioned later (refer to FIGS. 11 and 12).

Since the respective axes (five movable axes) of the machine tool and the onboard measuring device have the interface of the same structure, a position detecting signal from a position detector (not illustrated) of each of the axes and a position detecting signal from the onboard measuring device are easily input, in synchronization with each other, to a feed axis drive control portion of the numerical controller. Further, the numerical controller 8 and the personal computer 11 carry out a LAN communication via an Ethernet (registered trade mark) 12, and the position information of each of the axes and the displacement information of the probe of the onboard measuring device 1 are simultaneously input to the personal computer 11 which is an external storage device. FIG. 3 illustrates carrying out of measurement by utilizing a measuring software for storing the input position information of respective axes and displacement information of the probe. Further, according to one embodiment of the present invention, in the personal computer 11, a compensated machining program is created by compensating a machining program by using a shape data of the machining object 20 which is obtained by measuring.

FIG. 3 illustrates an example in which the measurement signal from the onboard measuring device is input to the personal computer via the numerical controller.

In this example, the respective axes of the machine tool and the onboard measuring device 1 attached to the B axis being a rotating shaft have interfaces of the same construction, the position detecting signal of each of the axes and the measurement signal of the onboard measuring device 1 are easily input, in synchronization with each other, to the servo control portion 9 which is the feed axis drive control portion of the numerical controller 8.

A description of one example of the onboard measuring device 1 is given with reference to FIG. 2. Position detecting signals ipx, ipy, ipz, ipb and ipc which are output from a position detecting device (not illustrated) embedded in a servo motor driving each of the axes (the X axis 3, the Y axis 4, the Z axis 5, the B axis 6 and the C axis 7) of the machine tool are input in a feedback manner to the servo control portion 9 of the numerical controller 8. Similarly, a position detecting signal ipf which is a measurement signal relating to a movement displacement of the probe 1b is input from the onboard measuring device 1 measuring a surface shape of a machining object W via the interface 2, to the servo control portion 9.

The position detecting signal which is output from the position detecting device in each of the movable axes of the machine tool is input to the servo control portion 9 via an interface (not illustrated). The interface is structured such that the position detecting signal which is output from the position detecting device embedded in the servo motor and the measurement signal which is output from the onboard measuring device 1 are input, in synchronization with each other, to the servo control portion 9 of the numerical controller 8.

Further, the numerical controller 8 is provided with a storage unit (not illustrated) which stores a position information of each of the movable axes of the machine tool 1 and a measured information (a position information) from the onboard measuring device 1, and an interface which delivers the position information stored in the storage unit to the personal computer 11 of the external device.

Since the position detecting signal which is the feedback signal from each of the movable axes of the machine tool and the measurement signal from the onboard measuring device are acquired by the servo control portion 9 of the numerical controller 8 via the interface 2 having the same circuit structure, the measurement signals from the position detecting device in each of the axes and the onboard measuring device (that is, the axial position detecting signal of each of the axes and the position detecting signal of the onboard measuring device) are easily and synchronously input to the numerical controller 8. Further, the read measurement signal is stored as the position information in a storage unit (not illustrated) of the numerical controller 8.

Further, the numerical controller 8 carries out a LAN communication via the Ethernet (registered trade mark) 12, for example, with the personal computer 11 which is the external device, and transmits the position information from each of the axes and the measured information from the onboard measuring device 1 to the personal computer 11, in the storage device 13 which is connected to or embedded in the personal computer 11. The personal computer 11 stores the position information from each of the axes and the position information from the onboard measuring device 1, in synchronization with each other, in the storage device 13 for each a sampling cycle. The measuring software is stored in the personal computer 11, and executes a predetermined computing process such as a shape measurement of the machining object or the like, on the basis of the position information which is read via the numerical controller 8.

Figure 4:
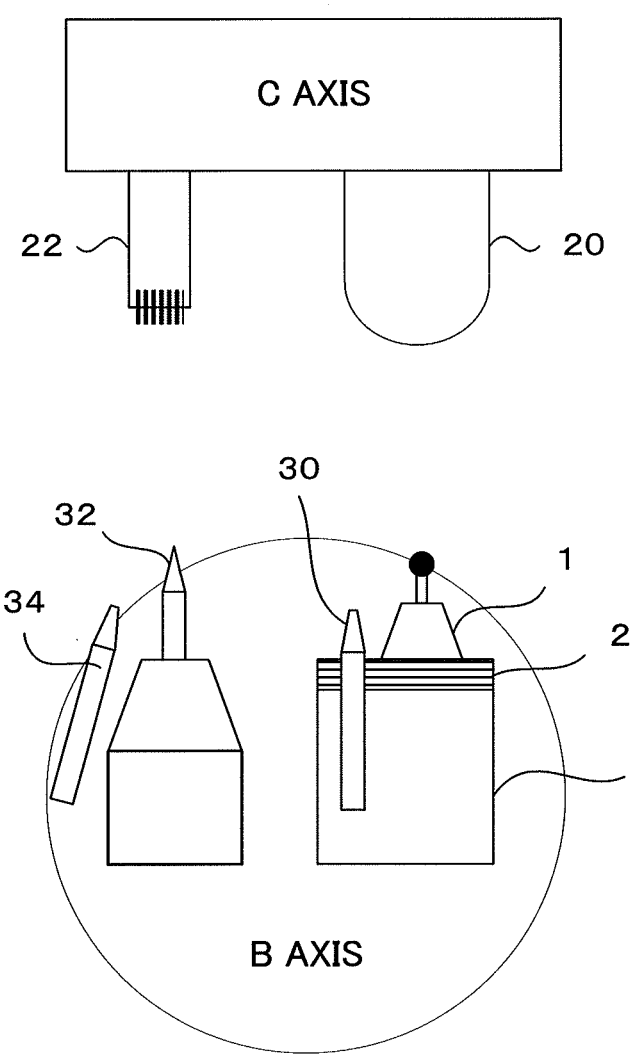
FIG. 4 is a view illustrating a tool, a cutting liquid nozzle, the onboard measuring device and its cover, and a washing liquid nozzle that are attached onto the B axis of the machine tool, and a machining object and a washing brush serving as a scraping means of a measuring element that are attached onto the C axis.

FIG. 4 is a schematic view of the machine tool which is provided with the onboard measuring device, as viewed downward in a direction of the rotating axis of the B axis in FIG. 3.

FIG. 4 illustrates a tool, a cutting liquid nozzle, an onboard measuring device and a cover of the onboard measuring device and a washing liquid nozzle which are attached onto the B axis of the machine tool, and a machining object and a washing brush serving as scraping means of a measuring element which are attached onto the C axis.

On the B axis (table), there are attached the accommodating device 24 which is provided with the automatic opening and closing cover 25, a washing liquid nozzle 30, a tool 32 which machines a machining object, and a cutting liquid nozzle 34 which injects cutting liquid. A tool 32 to be used may be a rotary type tool or a scratching type tool. The onboard measuring device 1 is accommodated within the accommodating device 24. In the onboard measuring device, an orientation of a measuring element (a rod 1e of the measuring element and a spherical measuring element 1f) is fixed to a direction which is orthogonal to the rotating shaft in the B axis. Further, it is possible to remove a cutting liquid and scrap on the surface of the machining object 20 by injecting the washing liquid from the washing liquid nozzle 30 onto the surface of the machining object 20 which has been processed. The machining object 20 and a washing brush 22 are attached onto the C axis (the table) The washing brush 22 wipes off the foreign material or the like attached to the measuring element (the rod 1e of the measuring element and the spherical measuring element 1f) of the onboard measuring device 1. A description will be given of the accommodating device 24 which accommodates the onboard measuring device 1 with reference to FIGS. 11 and 12.

Figure 5B:
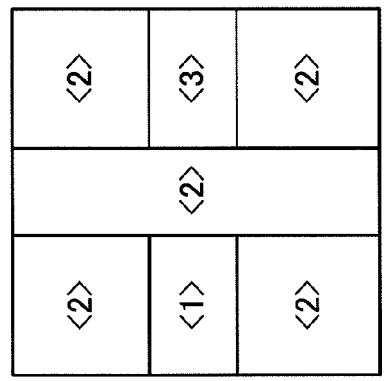
FIGS. 5A and 5B are views describing an effective machining range, an effective measuring range and a range which belongs to neither of them, with respect to an optional machining object, which are determined on the basis of a position of a drive axis.
Figure 5A:
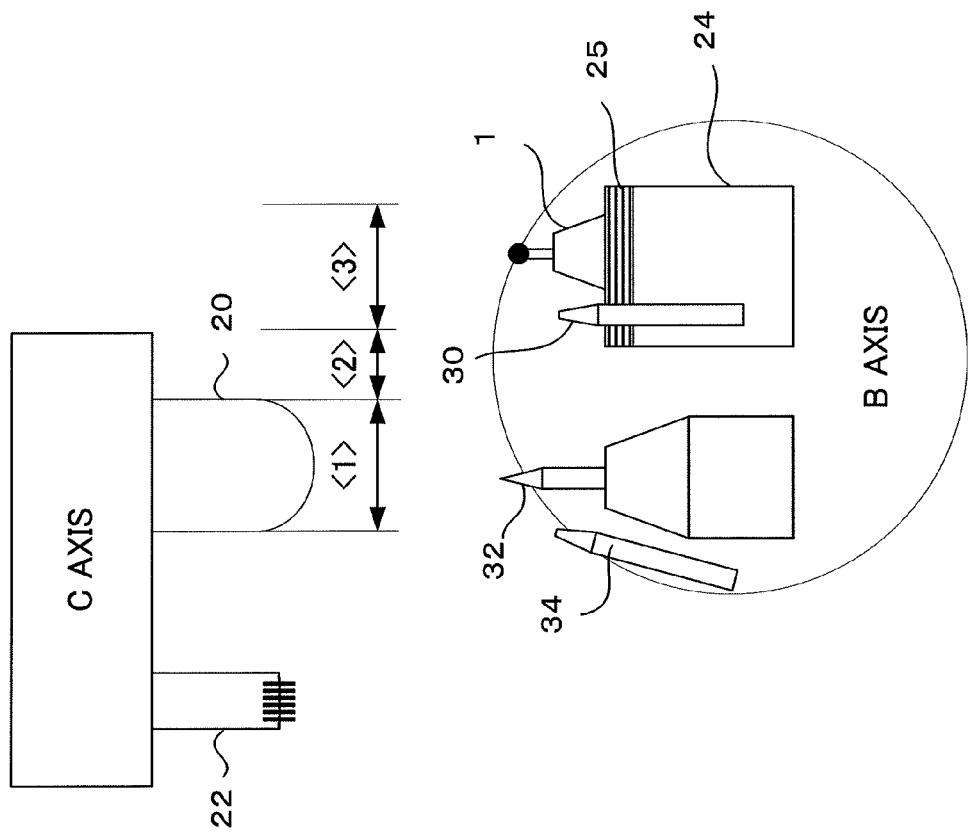

FIGS. 5A and 5B are views describing an effective machining range, an effective measuring range and a range which belongs to neither of them, with respect to an optional machining object, which are determined on the basis of a position of a drive axis. FIG. 5A is a drawing as viewed in the same direction as FIG. 4. FIG. 5B is a view of ranges <1>, <2> and <3> in a cross section which is vertical to the sheet paper of FIG. 5A.

In the present invention, the region on the C axis is divided in parallel to the direction of the rotating axis of the C axis. With respect to an optional machining object 20, range <1> is defined as an effective machining range, range <2> is defined as a range which belongs to neither the effective machining range nor the effective measuring range, and range <3> is defined as an effective measuring range. Ranges <1> and <3> are defined by a magnitude of the machining object 20, and range <2> is defined by an arrangement relationship between the tool 32 and the onboard measuring device 1 on the B axis. Which positional relationship of range <1>, range <2> and range <3> the machining object 20 and the onboard measuring device 1 or the tool 32 are in is determined on the basis of a relative positional relationship between the respective drive axes.

Figure 6:
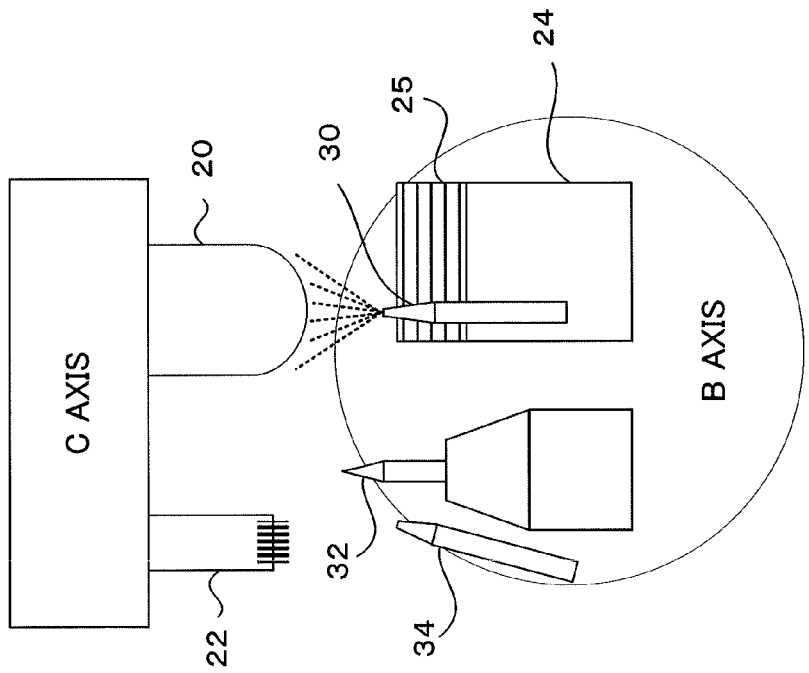
FIG. 6 is a view describing a step of machining the machining object by a tool while injecting a cutting liquid by a cutting liquid nozzle, in a state where a cover of the onboard measuring device is closed so as to be protected.

FIG. 6 is a view describing a step of machining a machining object by a tool while injecting cutting liquid by a cutting liquid nozzle, in a state where a cover of the onboard measuring device is closed so as to be protected.

If the numerical controller 8 determines that the relative positional relationship between the respective drive axes is in range <1> of an effective machining range, the automatic opening and closing cover 25 attached to the accommodating device 24 which accommodates the onboard measuring device 1 is closed on the basis of the command from the numerical controller 8, and machining position 36 illustrated by an arrow in the machining object 20 is machined according to a machining program by using the tool 32 while injecting cutting liquid toward the machining object 20 by the cutting liquid nozzle 34, in a state where the onboard measuring device 1 is protected.

Figure 7:
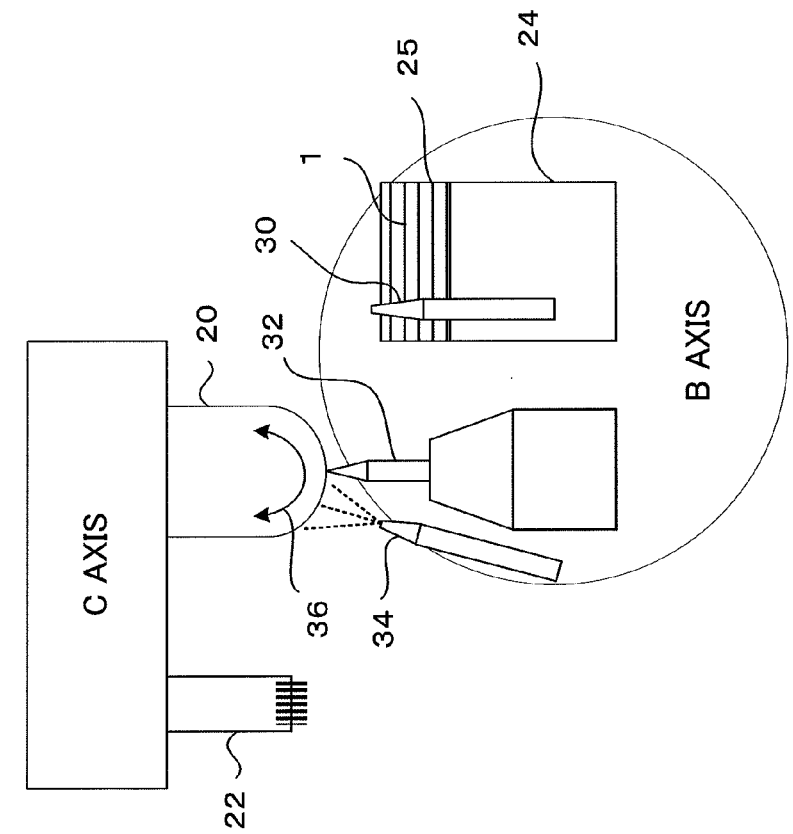
FIG. 7 is a view describing a step of removing the cutting liquid or cut scrap on the surface of the machining object, by injecting a washing liquid from a washing liquid nozzle along the surface of the machining object which has been machined.

FIG. 7 is a view describing a step of removing cutting liquid or cut scrap on the surface of the machining object, by injecting washing liquid from a washing liquid nozzle along the surface of the machining object which has been machined.

After machining of the machining object 20 illustrated in FIG. 6, the machining object 20 is relatively moved between the tool 32 and the measuring elements (1e, 1f) of the onboard measuring device 1, and is determined that it enters a range which belongs to neither the effective machining range nor range <2> of effective measuring range. Then, washing liquid is injected from the washing liquid nozzle 30 along the surface of the machining object 20 which has been machined, in a state where the automatic opening and closing cover 25 of the accommodating device 24 is closed so as to be protected, on the basis of the command of the numerical controller 8. Since the washing liquid is injected from the washing liquid nozzle 30, the cutting liquid and the cut scrap which are attached to the surface of the machining object 20 are removed.

For example, a state where the drive axes are in range <1> of effective machining range is considered to be a state where machining is possible; a state where the drive axes are in a range <2> which belongs to neither the effective machining range nor the effective measuring range is considered to be a washing standby state; a state where the drive axes shift from the washing stadby state to range <3> of effective measuring range is considered to be a washing effective state; and a state where washing is stopped after the washing is actually carried out for a predetermined time from the washing effective state is considered to be a state where measurement is possible.

Washing of the machining object 20 is carried out actually in range <3> of effective measuring range.

Dividing into states as described above, it is possible to remove a risk that the measuring element of the onboard measuring device 1 is damaged or an abnormality is generated in measured data, by the foreign material attached to the machining object 20, when carrying out a shape measurement of the machining object 20 by using the onboard measuring device 1.

Figure 8:
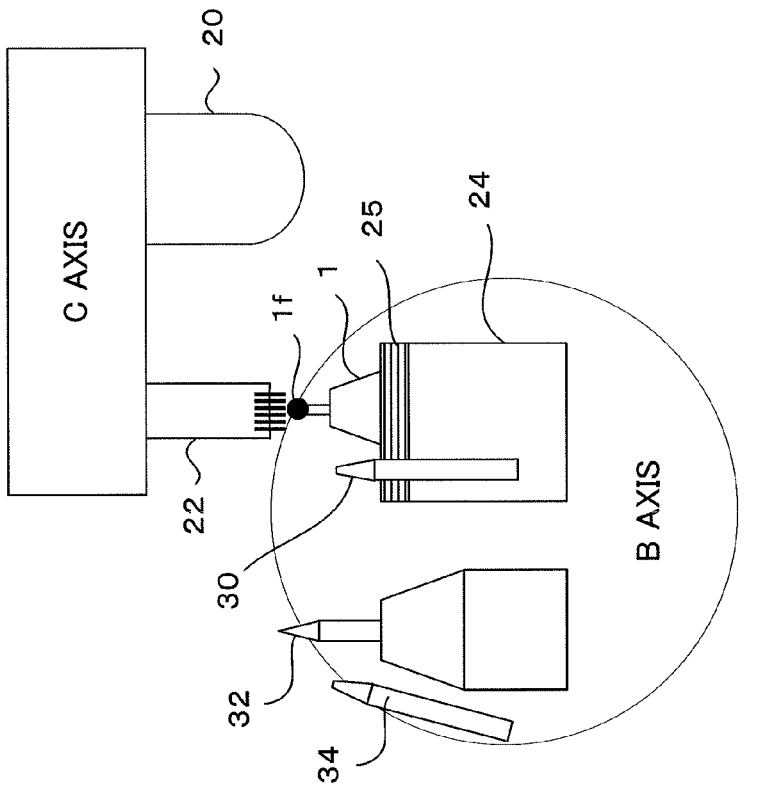
FIG. 8 is a view describing a step of measuring a shape of the machining object by a measuring element of the onboard measuring device of which a cover is opened.

FIG. 8 is a view describing a step of measuring the shape of the machining object by the measuring element of the onboard measuring device which is opened by opening the cover of the onboard measuring device.

When it is determined that the washing step of the machining object 20 by the washing liquid injection from the washing liquid nozzle 30 is finished, and the machining object 20 and the measuring element (the rod 1e of the measuring element and the spherical measuring element 1f) of the onboard measuring device 1 relatively move to range <3> of effective measuring range, the automatic opening and closing cover 25 of the accommodating device 24 is opened, and the shape of the machining object 20 is measured by the measuring element (the rod 1e of the measuring element and the spherical measuring element 1f) of the opened onboard measuring device 1, on the basis of the command of the numerical controller 1.

Figure 9:
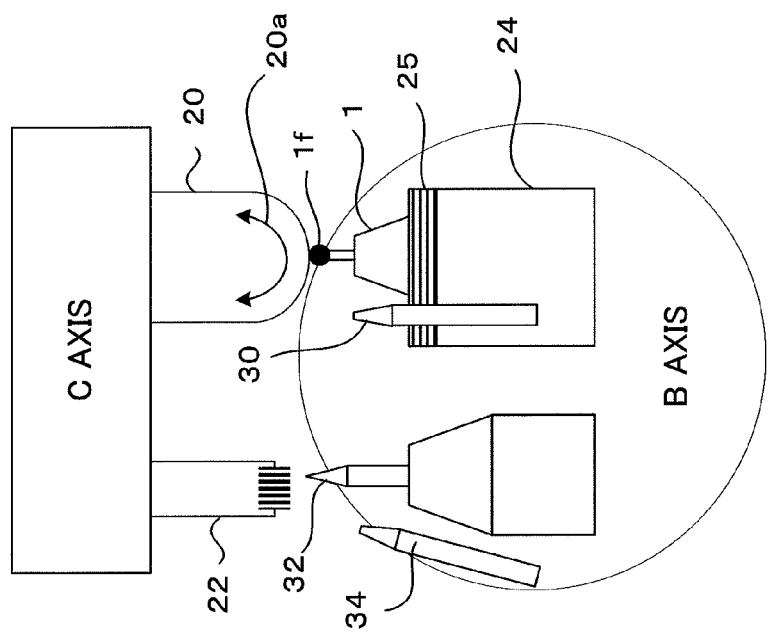
FIG. 9 is a view describing a step of removing foreign particles or the like attached to the measuring element.

FIG. 9 is a view describing a step of removing the foreign material or the like which is attached to the measuring element.

At a time of executing the shape measurement of the machining object 20 by using the onboard measuring device 1 illustrated in FIG. 8, it is desirable to previously carry out a work for wiping the foreign material or the like which is attached to the measuring element (the rod 1e of the measuring element and the spherical measuring element 1f) of the onboard measuring device 1.

It is possible to remove the foreign material or the like which is attached to the measuring element (the rod 1e of the measuring element and the spherical measuring element 1f) by relatively moving the measuring element (the rod 1e of the measuring element and the spherical measuring element 1f) of the opened onboard measuring device 1 to the position of the washing brush 22, and relatively moving the measuring element (the rod 1e of the measuring element and the spherical measuring element 1f) vertically and horizontally in the washing brush 22 which serves as the wiping means, in a state where the automatic opening and closing cover 25 of the accommodating device 24 which accommodates the onboard measuring device 1 is opened.

Figure 10:
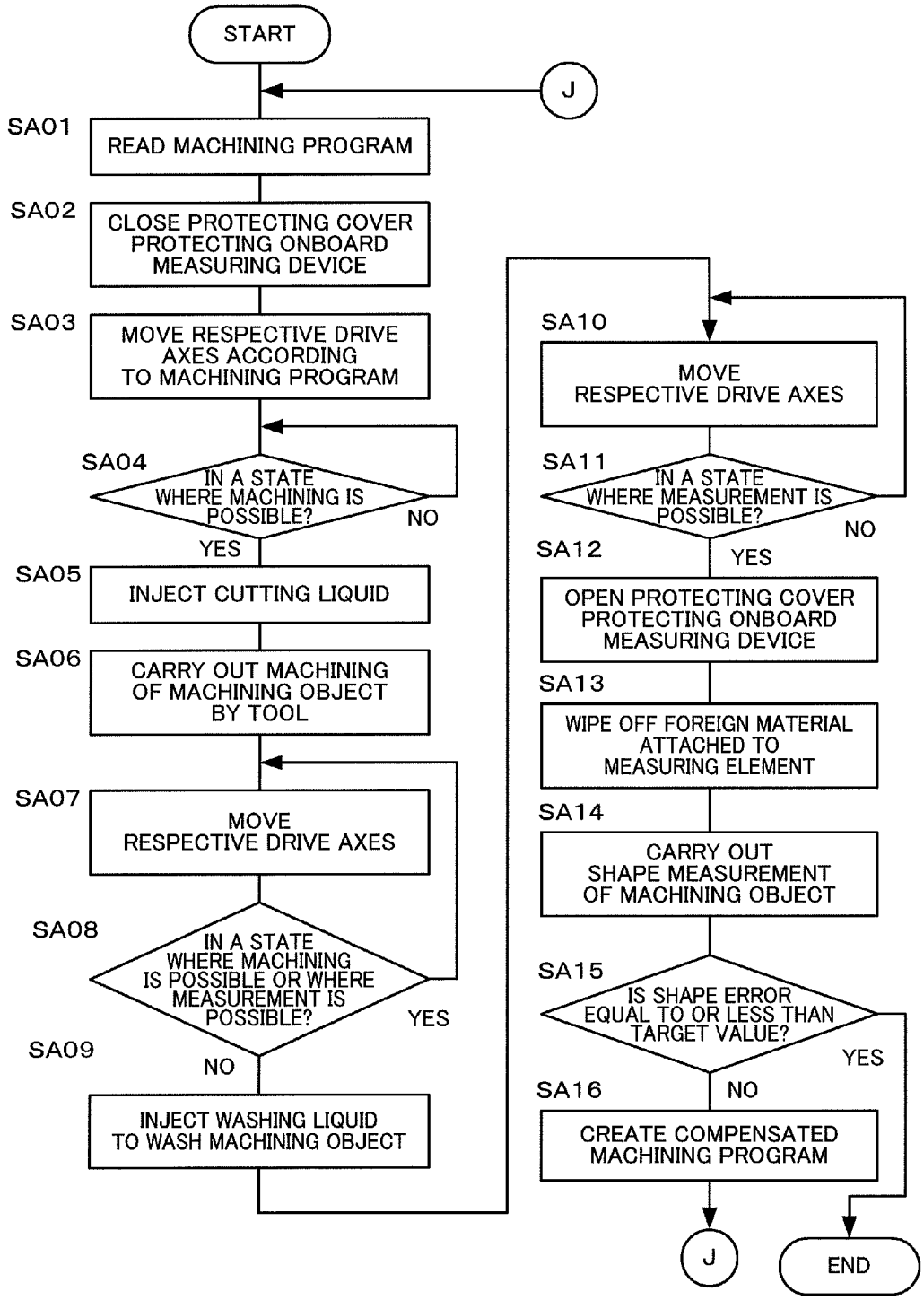
FIG. 10 is a flowchart describing a control of the machine tool provided with the onboard measuring device according to the present invention.

FIG. 10 is a flowchart describing a control of the machine tool which is provided with the onboard measuring device according to the present invention. The flowchart describes a process of carrying out a series of operations which are described by using FIGS. 6, 7, 8 and 9 without relying on worker's knowledge and skill relating to the operation, and describes according to each of the steps.

[step SA01] The machining program is read. The machining program includes a block which commands the process of the machining object, a block which commands the movement between effective machining range <1>, range <2> which does not belong to neither the effective machining range nor the effective measuring range, and effective measuring range <3>, and a block which commands the shape measurement of the machining object.

[step SA02] The protecting cover which protects the onboard measuring device is closed.

[step SA03] Each of the drive axes is moved according to the machining program.

[step SA04] Whether or not the drive axes are in a state where machining is possible is determined, and if they are in a state where machining is possible, then the process proceeds to step SA05, but if they are not in a state where machining is possible, the process waits until the drive axes are in a state where machining is possible and then proceeds to step SA05.

[step SA05] Cutting liquid is injected

[step SA06] Machining of a machining object is carried out by a tool.

[step SA07] Each of the drive axes is moved. If the machining of the machining object is finished, the respective drive axes are moved to the next range (a range which does not belong to neither an effective machining range nor an effective measuring range).

[step SA08] Whether the drive axes are in the effective machining state or in the effective measuring state is determined, and if they are in either of these states, the process proceeds to step SA07, but if they are in neither the effective machining state nor the effective measuring state, the process proceeds to step SA09.

[step SA09] The washing liquid is injected so as to wash the machining object.

[step SA10] Each of the drive axes is moved.

[step SA11] Whether or not the drive axes are in the effective measuring state (that is, in a state where measurement is possible) is determined, and if they are not in the effective measuring state, the process returns to step SA10, but if they are in the effective measuring state, the process proceeds to step SA12.

[step SA12] The protection cover for protecting the onboard measuring device is opened.

[step SA13] The foreign material which is attached to the measuring element is wiped off.

[step SA14] The shape measurement of the machining object is carried out.

[step SA15] Whether or not a shape error of the machining object which is obtained by the shape measurement is equal to or less than a target value is determined, and if not less than the target value (determination: NO), the process proceeds to step SA16, but if less than the target value (determination: YES), the process is finished.

[step SA16] A compensated machining program is created on the basis of the data which is obtained by the shape measurement, and the process returns to the step SA01. In the step SA01, the compensated machining program is read and the series of processes mentioned above is again executed.

A supplementary explanation of the flowchart described above is given below. Process in step SA04 determines whether or not the process is to be carried out with respect to the machining object, process in step SA11 determines whether or not the measurement is to be carried out by the onboard measuring device, and process in step SA08 determines whether or not washing of the machining object is to be carried out. The flowchart does not include determination as to whether washing of the probe (the measuring element) is carried out or not, however, The flowchart may include a process of determination as to whether or not a foreign material is attached to the measuring object based on the measurement signal from the onboard measuring device so that a determination as to whether or not washing of the probe by the washing brush 22 is to be performed may be executed. The processes in the steps SA04, SA08 and SA11 mentioned above correspond to "work determining unit" which constitutes the machine tool according to the present invention.

Further, process in step SA06 executes machining of the machining object, process in step SA14 executes measurement of the machining object by using the onboard measuring device, process in step SA09 execute washing of the machining object. The processes in the steps SA06, SA09, SA13 and SA14 correspond to "execution commanding unit" which constitutes the machine tool according to the present invention.

As illustrated in the flowchart mentioned above, a worker does not interpose in machining of a machining object, washing of the machining object, or shape measurement of the machining object, and it is possible to avoid a wide fluctuation of measurement precision and the machining time based on the worker's knowledge and skill relating to the operation. Accordingly, it is possible to produce a metal mold or the like having a high accuracy of form.

Figure 11:
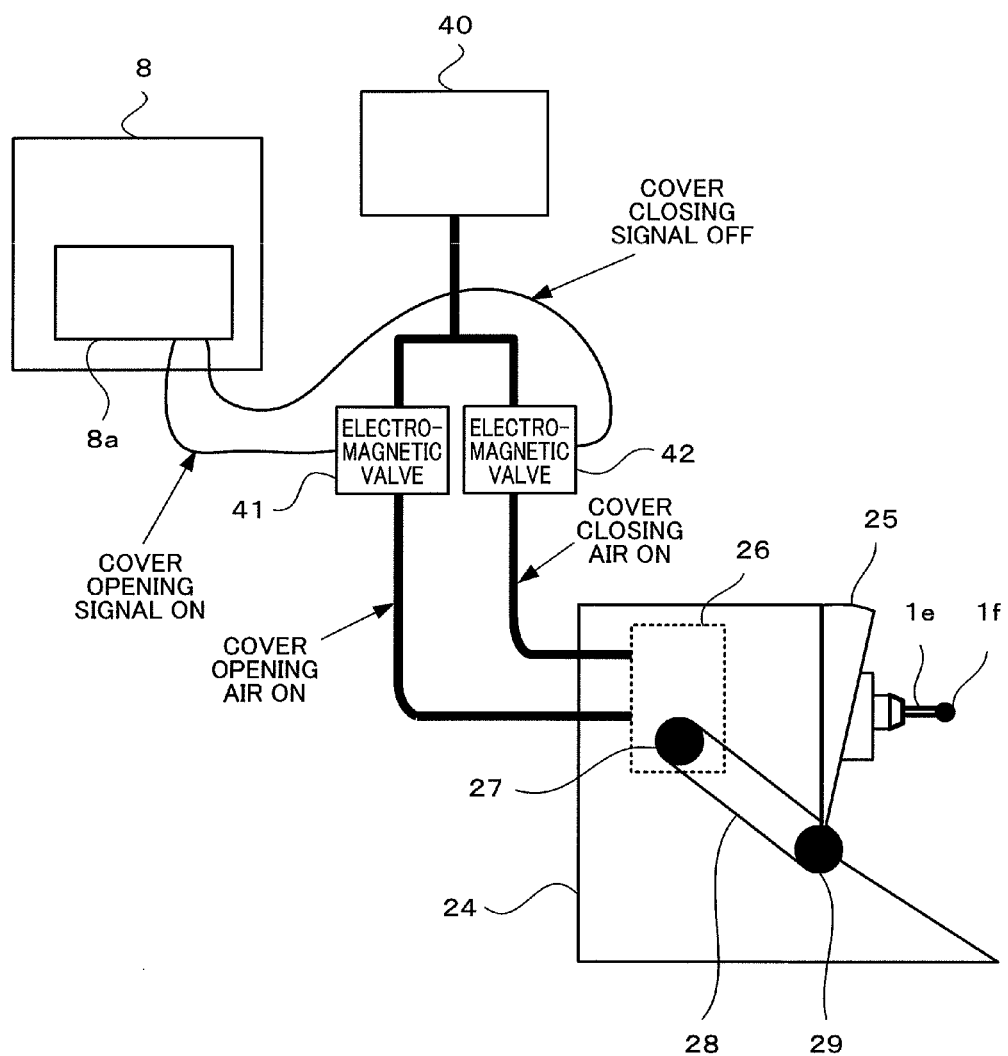
FIG. 11 is a view describing a state where an automatic opening and closing cover of the onboard measuring device is open.
Figure 12:
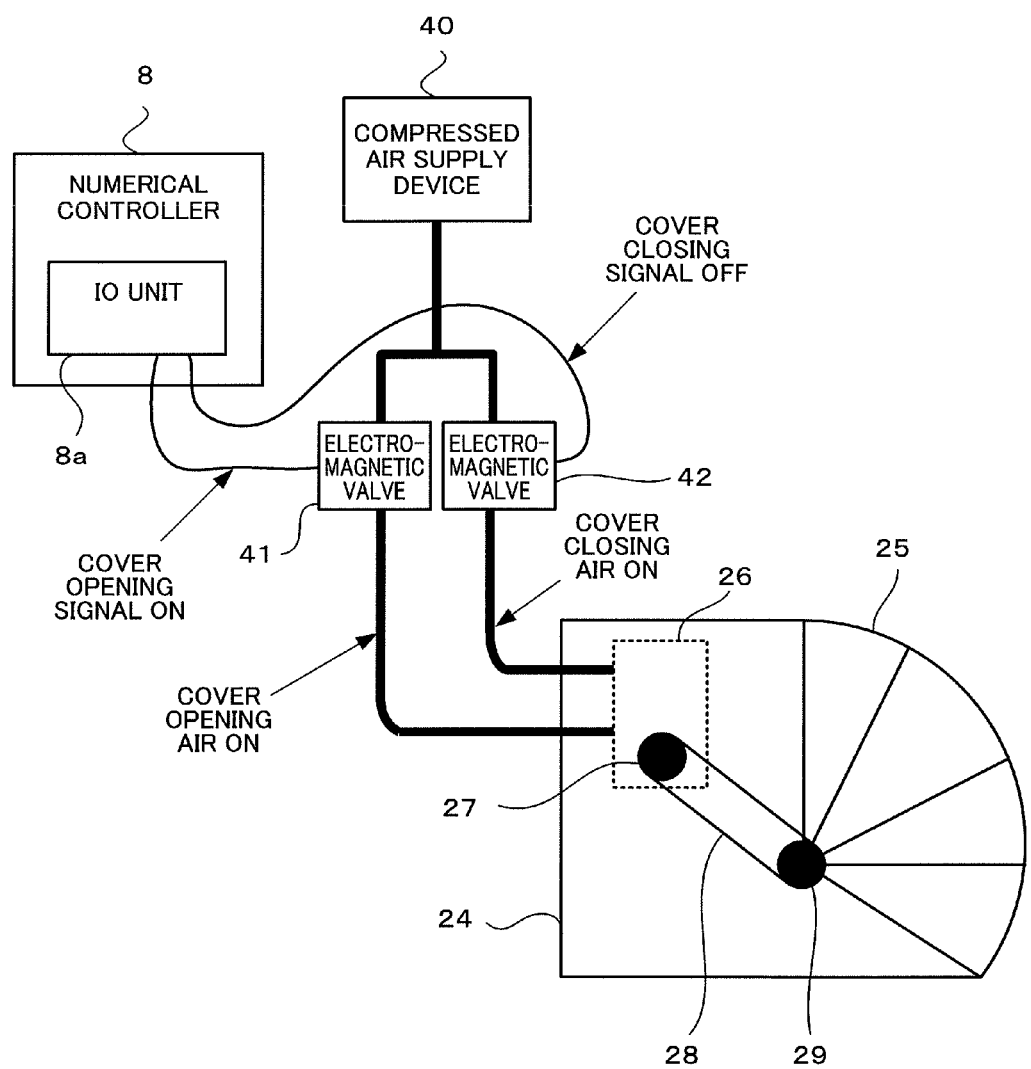
FIG. 12 is a view describing a state where the automatic opening and closing cover of the onboard measuring device is closed.

Next, a description will be given of the accommodating device 24 which is provided with the automatic opening and closing cover 25 accommodating the onboard measuring device 1, with reference to FIGS. 11 and 12. FIG. 11 is a view describing a state where the automatic opening and closing cover 25 of the accommodating device 24 is open. FIG. 12 is a view describing a state where the automatic opening and closing cover 25 of the accommodating device 24 is closed.

The automatic opening and closing cover 25 provided in the accommodating device 24 is a cover for protecting the measuring element of the onboard measuring device 1 from the cutting liquid and cut scrap. The automatic opening and closing cover 25 may preferably employ a bellows type or a material which is soft and can be easily compressed and expanded. In a state where the automatic opening and closing cover 25 is open, the measuring element (the rod 1e of the measuring element and the spherical measuring element 1f) is exposed to the measuring space and execution of measurement is possible.

The automatic opening and closing cover 25 is opened and closed by opening and closing electromagnetic valves 41 and 42 with a compressed air which is supplied from a compressed air supply device 40, and driving a pneumatic type rotary actuator 26. A rotation of a pulley 27 of the pneumatic type rotary actuator 26 is transmitted to a pulley 29 which is attached to a rotating shaft of the automatic opening and closing cover 25 via a belt 28.

An opening and closing motion of the electromagnetic valve 41 and the electromagnetic valve 42 is carried out on the basis of a signal which is commanded via an I/O unit of the numerical controller 8. As illustrated in FIG. 11, the pneumatic type rotary actuator 26 is driven by the compressed air which is supplied from the compressed air supply device 40 at a time when the electromagnetic valve 41 is open and the electromagnetic valve 42 is closed on the basis of a cover opening signal (ON) with respect to the electromagnetic valve 41 and a cover closing signal (OFF) with respect to the electromagnetic valve 42, and the automatic opening and closing cover 25 is opened. On the other hand, as illustrated in FIG. 12, if the signal indicating that the electromagnetic valve 42 is open and the electromagnetic valve 41 is closed is given to each of the electromagnetic valves 41 and 42 from the numerical controller 8, the automatic opening and closing cover 25 is closed. In a state where the automatic opening and closing cover 25 is closed, machining of the machining object 20 by using the tool 32 and washing of the machining object 20 are carried out.

It is to be noted here that the motion of the automatic opening and closing cover 25 is not limited to that described above. For example, it may be of a linear slide type in place of a rotary type. Further, the drive source of the automatic opening and closing cover 25 may be an electric motor, in place of the compressed air, which is directly connected to a power supply from the numerical controller 8. Use of air pressure would have advantages of having a little effect on measurement because air pressure does not generate heat.

The invention claimed is:

1. A machine tool having an onboard measuring device, which has a plurality of drive axes, machines a machining object by controlling the drive axis by a numerical controller so as to relatively move a tool and the machining object, and carries out a measurement of the machining object by relatively moving the onboard measuring device and the machining object, the onboard measuring device having a probe, the machine tool having the onboard measuring device comprising:
   a position detector which detects a position of each of the drive axes;
   an input unit which inputs a position which is detected by the position detector to the numerical controller;
   a work determining unit which determines, based on the positions of the drive axes input by the input unit, whether machining of the machining object is to be carried out, measurement of the machining object is to be carried out by the onboard measuring device, washing of the machining object is to be carried out, or washing of the probe is to be carried out; and
   an execution commanding unit which commands, based on the determination of the work determining unit, machining of the machining object, measurement by the onboard measuring device, washing of the machining object or washing of the probe;
   wherein
   the tool and the onboard measuring device are attached to the same drive axis,
   a moving range of the drive axes in which machining of the machining object by the tool is possible is assumed to be an effective machining range, and a moving range of the drive axes in which measurement of the machining object by the onboard measuring device is possible is assumed to be an effective measuring range,
   the work determining unit determines:
   that the drive axes are in a state where machining of the machining object by the tool is possible if the drive axes are in the effective machining range;
   that the drive axes are in a washing standby state if the drive axes are in a range which belongs to neither the effective machining range nor the effective measuring range;
   that the drive axes are in a washing effective state if the drives axes enter the effective measuring range from the washing standby state;
   that the washing has been finished if the washing is stopped after the washing is actually carried out for a predetermined time from the washing effective state; or
   that the drive axes are in a state where measurement of the machining object is possible if the drive axes are in the effective measuring range and also in a state where the washing is finished.

2. The machine tool having an onboard measuring device according to claim 1, wherein the numerical controller outputs a signal for executing a cutting motion by the tool, actuating a washing liquid nozzle, actuating a washing brush, actuating the onboard measuring device, or opening and closing a cover which protects the onboard measuring device, according to a working state based on the determination of the work determining unit.

3. The machine tool having an onboard measuring device according to claim 2, wherein
   the cover which protects the onboard measuring device is a cover for protecting the onboard measuring device from a cutting liquid and a cut scrap, and
   the cover is configured to be opened and closed by an actuator, and is opened by the actuator when the work determining unit determines that the drive axes are in a state where measurement is possible.

\* \* \* \* \*